US00RE39098E

(19) United States
(12) Reissued Patent
Klabunde et al.

(10) Patent Number: US RE39,098 E
(45) Date of Reissued Patent: May 23, 2006

(54) POROUS PELLET ADSORBENTS FABRICATED FROM NANOCRYSTALS

(75) Inventors: Kenneth J. Klabunde, Manhattan, KS (US); Olga Koper, Manhattan, KS (US); Abbas Khaleel, Uaeu (JO)

(73) Assignee: Kansas State University Research Foundation, Manhattan, KS (US)

(21) Appl. No.: 09/933,474

(22) Filed: Aug. 17, 2001

Related U.S. Patent Documents

Reissue of:
(64) Patent No.: 6,093,236
Issued: Jul. 25, 2000
Appl. No.: 09/093,249
Filed: Jun. 8, 1998

U.S. Applications:
(63) Continuation-in-part of application No. 09/087,657, filed on May 30, 1998, now abandoned.

(51) Int. Cl.
*B01D 53/02* (2006.01)
*B01D 59/26* (2006.01)
*B01J 23/02* (2006.01)
*C04B 35/03* (2006.01)

(52) U.S. Cl. ..... 95/135; 95/143; 423/635; 502/340; 501/123

(58) Field of Classification Search ..... 95/135, 95/143; 423/635; 501/123; 502/340
See application file for complete search history.

(56) References Cited

U.S. PATENT DOCUMENTS 2,474,207 A 6/1949 Lovell et al.
3,661,554 A * 5/1972 Wijard et al. ..... 75/3
3,780,500 A * 12/1973 Clemens et al. ..... 55/73
3,793,841 A * 2/1974 Dozsa ..... 61/36 R
3,974,256 A * 8/1976 Wheelock et al. ..... 423/230
4,002,720 A 1/1977 Wheelock et al.

(Continued)

OTHER PUBLICATIONS

Ganguly et al.; Sol–Gel Microsphere Pelletization Process for Fabrication of High–Density $ThO_2$—2% $UO_2$ Fuel for Advanced Pressurized Heavy Water Reactors; *Nucelear Technology;* vol. 73; pp. 84–94, Apr. 1986.*

Cano et al.; Development of direct reduction pellets containing MgO by Samarco Miceracao S/A; *Mining Engineering;* Jun. 1993, pp. 633–636.*

Browning; Agglomeration: Growing Larger in Applications and Technology; *Chemical Engineering;* Dec. 4, 1967, pp. 147–169.*

Agglomeration; *Chemical Engineering;* vol. 58, No. 10, Oct. 1951, pp. 161–170.*

(Continued)

*Primary Examiner*—Cam N. Nguyen
(74) *Attorney, Agent, or Firm*—Hovey Williams LLP

(57) ABSTRACT

Pelletized adsorbent compositions and methods of adsorbing toxic target compounds are provided for the destructive adsorption or chemisorption of toxic or undesired compounds. The pelletized adsorbents are formed by pressing together powder nanocrystalline particles comprising a metal hydroxide or a metal oxide at pressures of from about 50 psi to about 6000 psi to form discrete self-sustaining bodies. The pelletized bodies should retain at least about 25% of the surface area/unit mass and total pore volume of the starting metal particles.

19 Claims, 8 Drawing Sheets

U.S. PATENT DOCUMENTS

| | | | | | |
|---|---|---|---|---|---|
| 4,045,371 | A | | 8/1977 | Wheelock et al. | |
| 4,161,411 | A | * | 7/1979 | Sell et al. | 106/100 |
| 4,314,932 | A | * | 2/1982 | Wakimoto et al. | 260/42.53 |
| 4,324,776 | A | | 4/1982 | Kim | |
| 4,508,841 | A | * | 4/1985 | Onuma et al. | 502/73 |
| 4,543,341 | A | * | 9/1985 | Barringer et al. | 501/1 |
| 4,636,379 | A | | 1/1987 | Bestek et al. | |
| 4,696,680 | A | * | 9/1987 | Ghate et al. | 55/25 |
| 4,755,365 | A | * | 7/1988 | Funahashi et al. | 423/75 |
| 4,833,108 | A | * | 5/1989 | Mizuno et al. | 501/98 |
| 5,008,221 | A | * | 4/1991 | Ketcham | 501/103 |
| 5,059,405 | A | * | 10/1991 | Watson et al. | 423/210 |
| 5,173,279 | A | | 12/1992 | Dumont et al. | |
| 5,231,063 | A | * | 7/1993 | Fukumoto et al. | 502/62 |
| 5,290,332 | A | * | 3/1994 | Chatterjee et al. | 65/18.1 |
| 5,358,913 | A | * | 10/1994 | Chatterjee et al. | 501/103 |
| 5,420,086 | A | * | 5/1995 | Brandau et al. | 501/103 |
| 5,463,167 | A | * | 10/1995 | Ou | 585/823 |
| 5,482,536 | A | | 1/1996 | Ngai et al. | |
| 5,540,896 | A | | 7/1996 | Newby | |
| 5,540,981 | A | * | 7/1996 | Gallagher et al. | 428/220 |
| 5,670,247 | A | * | 9/1997 | Takaoka et al. | 428/297 |
| 5,712,219 | A | * | 1/1998 | Klabunde et al. | 502/328 |
| 5,759,939 | A | * | 6/1998 | Klabunde et al. | 502/328 |
| 5,807,798 | A | * | 9/1998 | Bolt et al. | 501/94 |
| 5,858,212 | A | | 1/1999 | Darcy | |
| 5,914,436 | A | * | 6/1999 | Klabunde et al. | 588/205 |
| 5,928,496 | A | * | 7/1999 | Albers et al. | 208/113 |
| 6,080,281 | A | | 6/2000 | Attia | |

OTHER PUBLICATIONS

Effect of Ferric Oxide on the High–Temperature Removal of Hydrogen Sulfide over ZnO—$Fe_2O_3$ Mixed Metal Oxide Sorbent; Young–Soo Lee, Hee–Taik Kim, and Kyong–Ok Yoo; *Ind. Eng. Chem. Res.,* vol. 34, No. 4, 1995; pp. 1181–1188.

Characterization of Reaction between Zinc Oxide and Hydrogen Sulfide; Eiji Sasaoka; *Energy & Fuels,* vol. 8, No. 5, 1994; pp. 1100–1105.

Kinetics of the Absorption of Hydrogen Sulfide by High Purity and Doped High Surface Area Zinc Oxide; J. Michael Davidson, Catriona H. Lawrie and Khalid Sohail; *Ind. Eng. Chem. Res.,* vol. 34, No. 9, 1995; pp. 2981–2989.

A DRIFTS Study of the Surface and Bulk Reactions of Hydrogen Sulfide with High Surface Area Zinc Oxide; J. Michael Davidson and Khalid Sohail; *Ind. Eng. Chem. Res.,* vol. 34, No. 11, 1995; pp. 3675–3677.

* cited by examiner

POROUS PELLET ADSORBENTS FABRICATED FROM NANOCRYSTALS

Matter enclosed in heavy brackets [ ] appears in the original patent but forms no part of this reissue specification; matter printed in italics indicates the additions made by reissue.

RELATED APPLICATION

This is a continuation-in-part of application Ser. No. 09/087,657, filed May 30, 1995, now abandoned.

*FEDERALLY SPONSORED RESEARCH/ DEVELOPMENT PROGRAM*

*This invention was made with government support under Grants DAAH*-04-93-G-0328 and DAAG55-97-C-0036 awarded by the United States Army Research Office. The government has certain rights in the invention.

BACKGROUND OF THE INVENTION

1. Field of the Invention

The present invention is broadly concerned with pelletized finely divided adsorbents selected from the group consisting of metal oxides, metal hydroxides, and mixtures thereof, and methods of forming such pellets. The pellets are preferably formed by pressing the finely divided metal adsorbents at pressures of from about 50 psi to about 6000 psi to yield self-sustaining bodies which retain at least about 25% of the surface area/unit mass and total pore volume of the starting mewl adsorbents prior to pressing thereof. In use, target compound(s) are contacted with adsorbent pellets of the invention to destructively adsorb or chemisorb the target compound(s).

2. Description of the Prior Art

There is mounting concern about air quality, particularly the quality of indoor air. In most cases, indoor air is of worse quality than outdoor air. The removal of gaseous contaminants from air can be achieved by the application of a variety of principles. These include adsorption, catalytic transformation, and absorption. Among these adsorption is the most widely applied method. In adsorption, gases, vapors, or liquids come into contact with the surface of the adsorbent and adhere to it to some degree. This adsorption can be the result of residual physical forces (Van der Waal's forces) or chemical binding to the surface where the adsorbed molecule binds stronger to the adsorbing surface. Although adsorption can occur on a variety of solid surfaces, only a few materials have adsorptive characteristics sufficiently favorable for air cleaning. These include activated carbons, zeolites, molecular sieves, silica gel, and activated alumina.

Activated carbon has been the most commonly used is dealing with purification of air. The highest quality activated carbon is made from coconut shells and has a surface area/unit mass of about 600–900 $m^2/g$. However, activated carbon does not strongly adsorb air pollutants and the adsorbed material an be released over time with confirmed air flow. Moreover, activated carbon is difficult to clean up.

Another tool for indoor air purification is as electrostatic filter. Electrostatic filters work well at removing particulates from the indoor air. However, electrostatic filters are inadequate at removing many chemical vapors from the air, and there are numerous chemical vapor air pollutants which are of concern. The most prevalent of these include formaldehyde, acetaldehyde, methanol, methylene chloride, carbon tetrachloride, arbors monoxide, dimethyl amine, toluene, benzene, sulfur dioxide, acetonitrile, nitrosoamine, and nitrogen dioxide.

Nanocrystals make up a high surface area form of matter that can serve as another adsorbent which can be used for removing pollutants such as chlorocarbons, acid gases, military warfare agents, and insecticides from the air. The unique chemical reactivity of nanocrystals allows the destructive adsorption and chemisorption of toxic substances and are a substantial advance in air purification. However, nanocrystals are a very fine dust which take up large volumes of space and are conducive to electrostaticity, thus making them difficult to handle and at times inconvenient.

There is a need for an adsorbent compound capable of strongly adsorbing air pollutants which does not release those pollutants over time. Furthermore, this absorbent compound must be easy to handle and be of decreased volume compared to nanocrystal adsorbents.

SUMMARY OF THE INVENTION

The present invention overcomes these problems and provides adsorbent pellet bodies and methods for adsorbing a wide variety of target compounds using such pellet bodies. To this end, the invention contemplates the use of adsorbent pellets which are formed by pressing lively divided adsorbents. Adsorbent reactions using the inventions can be carried out over a wide range of temperatures, but preferably the temperature is such that the target compounds are in gaseous form.

In more detail, the adsorbent pellets of the invention are formed by pressing or agglomerating a quantity of finely divided adsorbent powder selected from the group consisting of metal hydroxides, metal oxides, and mixtures thereof. More preferably, the powder is an oxide or hydroxide of Mg, Ca, Ti, Zr, Fe, V, Mn, Ni, Cu, Al, or Zn. Metal oxides are the most preferred adsorbent powder with MgO and CaO being particularly preferred. While conventionally prepared powders can be used to form the pellets, the preferred powders are prepared by aerogel techniques from Utamapanya et al., Chem. Mater., 3:175–181 (1991). The starting powders should advantageously have an average crystallite size of up to about 20 nm, and more preferably from about 3 to 9 nm. The pellets of this invention are formed by pressing the adsorbent powder at a pressure of from about 50 psi to about 6000 psi, more preferably from about 500 psi to about 5000 psi, and most preferably at about 2000 psi. While pressures are typically applied to the powder by way of an automatic or hydraulic press, one skilled in the art will appreciate that the pellets can be formed by any pressure-applying or other agglomerating means (e.g., centrifugal or vibratory agglomerators). Furthermore, a binder or filler can be mixed with the adsorbent powder and the pellets can be formed by pressing the mixture by hand. Agglomerating of agglomerated as used hereinafter includes pressing together of the adsorbent powder as well as pressed together adsorbent powder. Agglomerating also includes the spraying, adhering, centrifugation, vibration or pressing of the adsorbent powder (either alone or in a mixture) to form a body, which may optionally be famed around a cue material other than the adsorbent powder. To give but out example, the adsorbent powders of the invention can be embedded in or supported on a porous substrate such as a filtration media.

If a metal oxide pellet is desired, the corresponding metal hydroxide should be thermally converted (i.e., "activated" at 500° C., overnight is a vacuum) to the metal oxide form. Activation can be carried out either on the metal hydroxide powder or on the finished metal hydroxide pellet. However, it is preferred that the metal hydroxide first be pressed into a pellet followed by thermal conversion to a metal oxide pellet.

The pellets of the invention should retain at least about 23% of the multi-point surface area/unit mass of the metal hydroxide or metal oxide (whichever was used to form the pellet) particles prior to pressing together thereof. More preferably, the multi-point surface area/unit mass of the pellets will be at least about 50%, and most preferably at least about 90%, of the multi-point surface area/unit mass of the starting metal oxide or metal hydroxide particles prior to pressing. In another embodiment, the pellets retain at least about 25% of the total pore volume of the metal hydroxide or metal oxide particles prior to pressing thereof, more preferably, at least about 50%, and most preferably at least about 90% thereof. In the most preferred forms, the pellets of ibis invention will retain the above percentages of both the multi-point surface area/unit mass and the total pore volume.

In terms of pore radius, the preferred pelletized adsorbents should have an average pore radius of at least about 45 Å, more preferably from about 50 Å to about 100 Å, and most preferably from about 60 Å to about 75 Å. The pellets of this invention normally have a density of from about 0.2 to about 2.0 g/cm$^3$, more preferably from about 0.3 to about 1.0 g/cm$^3$, and most preferably from about 0.4 to about 0.7 g/cm$^3$. The minimum surface-to-surface dimension of the pellets (e.g., diameter in the case of spherical or elongated pellet bodies) of this invention is at least about 1 mm, more preferably from about 10–20 mm.

Broadly speaking, the use of the pelletized adsorbents in accordance with the invention is carried out by contacting the adsorbent powders with a target compound in fluid (i.e., liquid or gaseous) form. Preferable contacting systems include any type of flow reactor which allows a fluid stream containing the target compound to be circulated through a mass of pellets. Another suitable contacting system includes forming a membrane which contains the pelletized adsorbents and using the membrane to filter the target compound from a gas or liquid. The contacting step can take place over a wide range of temperatures and pressures; however, it is preferable that the temperature be such that the conveying stream and target compound are in a gaseous form.

A wide variety of target compounds can be adsorbed using the techniques of the invention. These target compounds broadly include any compounds which can be adsorbed, either destructively adsorbed or chemisorbed, by the starting metal hydroxide or metal oxide powder. More particularly, these target compounds may be selected from the group consisting of acids, alcohols, aldehydes, compounds containing an atom of P, S, N, Se or Te, hydrocarbon compounds (e.g., both halogenated and non-halogenated hydrocarbons), and toxic metal compounds.

DETAILED DESCRIPTION OF THE PREFERRED EMBODIMENTS

Figure 1:
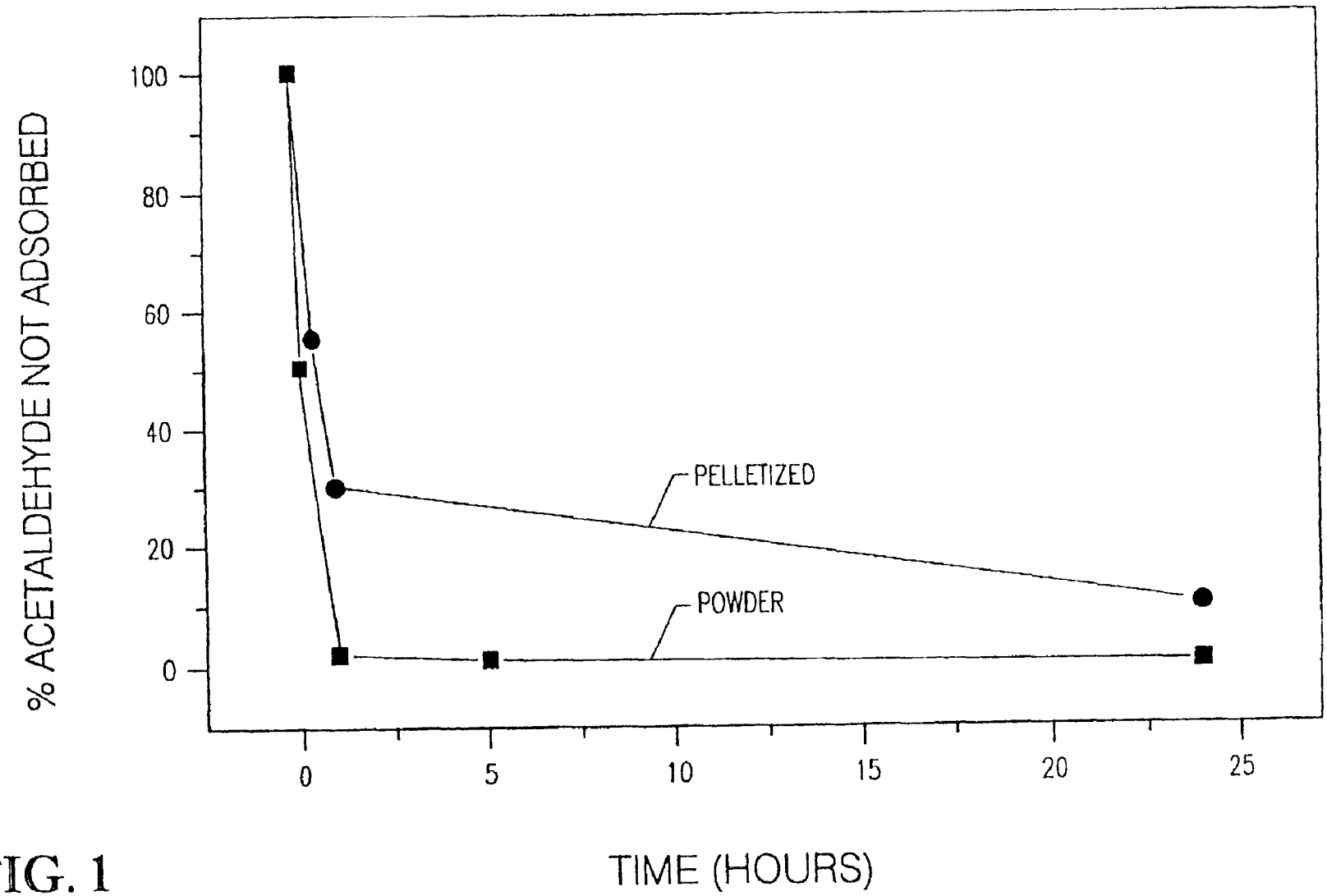
FIG. 1 is a graph depicting the adsorption of acetaldehyde on pelletized AP—MgO compared to adsorption of acetaldehydes on powder AP—MgO.

The following examples set forth preferred methods in accordance with the invention. It is to be understood, however, that these examples are provided by way of illustration and nothing therein should be taken as a limitation upon the overall scope of the invention. In these examples, "AP—MgO" and "AP-CaO" refer to the respective aerogel (or autoclave) prepared oxides. "CP—MgO" and "CP—CaO" refer to the respective oxides produced by conventional techniques. "CM—MgO" and "CM—CaO" refer a the respective commercially available oxides.

EXAMPLE 1

In this example, adsorbent AP—$Mg(OH)_2$ pellets were prepared and their surface characteristics were determined. These characteristics were compared to the characteristics of AP—$Mg(OH)_2$ in its powder form.

Materials and Methods

1. Preparation of AP—$Mg(OH)_2$ Powder (no activation)

Highly divided nanocrystalline $Mg(OH)_2$ samples were prepared by the autoclave treatment described by Utamapanya et al., Chem. Mater., 3:175–181 (1991), incorporated by reference herein. In this procedure, 10% by weight magnesium methoxide is methanol solution was prepared and 83% by weight toluene solvent was added. The solution was then hydrolyzed by addition of 0.75% by weight water dropwise while the solution was stirred and covered with aluminum foil to avoid evaporation. To insure completion of the reaction, the mixture was stirred overnight. This produced a gel which was treated in an autoclave using a glass lined 600 ml capacity Parr miniature reactor. The gel solution was placed within the reactor and flushed for 10 minutes with nitrogen gas, whereupon the reactor was closed and pressurized to 100 psi using the nitrogen gas. The reactor was then heated up to 265° C. over a 4 hour period at a beating rate of 1° C./min. The temperature was then allowed to equilibrate at 265° C. for 10 minutes (final reactor pressure was about 700 psi). At this point, the reactor was vented to release the pressure and vent the solvent. Finally, the reactor was flushed with nitrogen gas for 10 minutes.

2. Preparation of AP—$Mg(OH)_2$ Pellets

The AP—$Mg(OH)_2$ powder prepared as set forth above was ground, using a mortar and pestle, to remove any clumped powder. A portion of the powder was then placed in a small hydraulic press to make spherical 12 mm diameter pellets. Pressures ranging from 1000 psi to 10,000 psi were applied to form the pellets. The resulting pellets were crushed through sieves to form smaller pellets in order to facilitate the measuring of the surface characteristics (the sieve size was 0.27–1.168 mm).

A second portion of the AP—$Mg(OH)_2$ powder was pelletized using a Stokes automatic press. The actual pressure applied is not known because the Stokes press did not have a gauge. However, the actual pressure applied to prepare the pellets is reproducible by controlling the movement of the upper punch on the pelletizer which has a scale. Low compression is just enough pressure to allow the sample to be handled without crumbling. High compression is the maximum compression that can be used without jamming the machine or causing pellets to crack as they are ejected. Medium is the setting approximately half way between low and high.

3. Determination of Surface area/unit mass of AP—Mg $(OH)_2$ Powder and Pellets

The surface area/unit mass and total pore volume were measured for the powder prepared above, as well as for the resultant pellets which were press-formed.

Similar surface area/unit mass measurements were performed using 70 mg samples of magnesium hydroxide from each preparative procedure. Specifically, the powder samples were heated to a temperature of 120° C. under dynamic vacuum (about $1\times10^{-2}$ Torr), held for 10 minutes, and then allowed to cool. Both the Brunauer-Emmett-Teller (BET) one-point and multi-point gas absorption methods were employed using $N_2$ adsorption at liquid $N_2$ temperature to measure the surface area/unit mass. The BET surface area measurement techniques are described in Introduction to Powder Surface Area, Lowell. S., John Wiley & Sons: New York (1979), incorporated by reference herein.

4. Determination of Total Pore Volume of AP—$Mg(OH)_2$

The total pore volume was determined by the Barrett, Joyner, and Halenda (BJH) method. Too sample was placed in a closed glass cell connected to a manifold filled with nitrogen gas. The sample cell was immersed in liquid nitrogen until the Pressure above the sample was the same as ambient pressure at which time the pores were assumed to be filled with liquid nitrogen. The pressure above the sample was then reduced to 95% of ambient pressure and the volume of nitrogen gas released from the sample was measured by the BET machine. This desorption process was carried out at 90%, 85%. 80%, and so on down to 5% of ambient pressure. At each interval, the volume of nitrogen gas released from the sample is measured and used to derive the total pore volume. The BET total pore volume measurement techniques are described in the Quantachrome NOVA 2200 Gas Sorption Analyzer's User's Manual (Version 4.01), incorporated by references herein.

Results and Discussion

1. Comparison of Characteristics of Powder AP—$Mg(OH)_2$ vs. Pelletized AP—Mg(OH)2 a. Pellets Formed by Small Hydraulic Press

The surface area/unit mass for the multiple BET decreased from 346 $m^2/g$ for the powder to 4.16 $m^2g$ for the 10,000 psi pellets. The same was seen for the single point BET surface area/unit mass, which went from 635 $m^2/g$ for the powder to 8.29 $m^2/g$ for the 10,000 psi pellets, the total pore volume also decreased from 0.956 cc/g for the powder to 0.01217 cc/g for the 10,000 psi pellets. The average pore radius was affected very little with change in the pressure. There was however a significant change in the isotherm curves, which indicates a change in pore shape. The powder sample (before pelletization) looked almost identical to the sample subjected to a pressure of 1,000 psi. The results are illustrated in Table 1.

TABLE 1

Surface area/unit mass and pore size distribution of magnesium hydroxide in powder and pellet form, prepared using the hydraulic press.

| Form | Applied Pressure (psi) | Multi-point S.A. ($m^2/g$) | % Multi-point S.A.[b] | Single point S.A. ($m^2/g$) | Total pore volume (cc/g) | % Total Pore Volume[c] | Avg. pore radius (Å) | Pore Shape Type[d] |
|---|---|---|---|---|---|---|---|---|
| Powder | None | 346 | — | 635 | 0.956 | — | 55.2 | E |
| Pellet[a] | 1,000 | 289 | 83.5 | 534 | 0.803 | 83.9 | 55.6 | A, E |
| Pellet | 2,000 | 235 | 67.9 | 458 | 0.629 | 65.8 | 53.5 | A, E |
| Pellet | 4,000 | 116 | 33.5 | 254 | 0.311 | 32.5 | 53.5 | A |
| Pellet | 5,000 | 80.3 | 23.2 | 165 | 0.216 | 22.6 | 53.8 | A |
| Pellet | 10,000 | 4.16 | 1.2 | 8.29 | 0.0122 | 1.3 | 58.4 | D |

[a]Pellet size is 0.250–1.168 mm.

[b]Percent of multi-point surface area/unit mass retained by pellet when compared to multi-point surface area/unit mass of the powder

[c]Percent of total pore volume retained by pellet when compared to total pore volume of the powder

[d]Pore shape type abbreviation are as follows: A—Cylindrical pores, open at both ends; B—Tapered or wedged-shaped pores with narrow necks open at one or both ends; and E—Bottleneck pores Table 1 demonstrates that the surface characteristics change a great deal depending on formation pressure. It is noted that in going from the powder to the pellet compressed at 1,000 psi, the surface area/unit mass and pore size changed only a little; therefore, these pellets can be used in any type of flow reactor. In conclusion, it was found that the 1,000 psi pellets of AP—$Mg(OH)_2$ worked ideally by eliminating the problem caused by electrostatic forces, without losing a significant amount of surface area/unit mass or pore volume.

b. Pellets Formed by Stokes Automatic Press

Referring to Table 2, it can again be seen that pelletization did not significantly decrease the surface areas/unit mass and porosities of the AP—$Mg(OH)_2$. In some instances the surface area/unit mass was even higher than that of the powder. The pellets made with low compression were very brittle and, after activation (heating at 500° C. under vacuum), they turned into powder. The medium compression pellets were much better, and only a small amount of powder was present after activation. The pellets formed by high compression were sturdy and did not break or form powder upon activation. Therefore, the medium and high compression pellets are ideal. Because the Stokes press did not include a pressure gauge, the exact value of the pressure used in the high compression test is not known. However, in comparing the pellet characteristics of Table 2 with those of Table 1, the high compression is likely around 2000 psi.

TABLE 2

Surface area/unit mass and pore size distribution of magnesium hydroxide in a powder and pellet form, prepared using the Stokes press.

| Form | Relative Compression | Multi-point S.A. ($m^2/g$) | % Multi-point S.A.[a] | Single point S.A. ($m^2/g$) | Total pore volume (cc/g) | % Total Pore Volume[b] | Average pore radius (Å) | Pore Shape Type[c] |
|---|---|---|---|---|---|---|---|---|
| Powder | None | 386 | — | 692 | 1.038 | — | 53.8 | E |
| Pellet | Low | 440 | 114.0 | 699 | 1.090 | 105.0 | 49.5 | A, E |
| Pellet | Medium | 346 | 89.6 | 679 | 0.944 | 90.9 | 54.6 | A, E |
| Pellet | High | 300 | 77.7 | 606 | 0.794 | 76.5 | 53.0 | A, E |

[a]Percent of multi-point surface area/unit mass retained by pellet when compared to multi-point surface area/unit mass of the powder.
[b]Percent of total pore volume retained by pellet when compared to a total pore volume of the powder.
[c]Pore shape type abbreviation are as follows: A—Cylindrical pores, open at both ends; D—Tapered or wedged-shaped pores with narrow necks opened at one or both ends; and E—Bottleneck pores

EXAMPLE 2

In this example, adsorbent AP—MgO pellets (one sample activated in its pellet form and one sample activated in its powder form) were prepared from AP—$Mg(OH)_2$ powder and their physical characteristics were determined. These characteristics were compared to the characteristics of AP—MgO in its powder form. The purpose of this test was to determine whether the AP—MgO pellets would maintain substantially the same surface characteristics when activated in its pellet form as when activated in the powder form. It is preferable to pelletize the hydroxide first, and then activate the pellets, which converts the pellets to the oxide.

Materials and Methods

1. Preparation of AP—$Mg(OH)_2$ Powder (no activation) and AP—MgO Powder (with activation)

Highly divided nanocrystalline $Mg(OH)_2$ samples were prepared by the autoclave treatment described by Utamapanya et al., *Chem. Mater.*, 3:175–181 (1991), incorporated by reference herein. In this procedure, 10% by weight magnesium methoxide in methanol solution was prepared and 83% by weight toluene solvent was added. The solution was then hydrolyzed by addition of 0.75% by weight water dropwise while the solution was stirred and covered with aluminum foil to avoid evaporation. To insure completion of the reaction, the mixture was stirred overnight. This produced a gel which was treated in as autoclave using a glass lined 600 ml capacity Parr miniature reactor. The gel solution was placed within the reactor and flushed for 10 minutes with nitrogen gas, whereupon the reactor was closed and pressurized to 100 psi using the nitrogen gas. The reactor was then heated up to 265° C. over a 4 hour period at a heating rate of 1° C./min. The temperature was then allowed to equilibrate at 265° C. for 10 minutes (final reactor pressure was about 700 psi). At this point, the reactor was vented to release the pressure and vent the solvent. Finally, the reactor was flushed with nitrogen gas for 10 minutes.

The $Mg(OH)_2$ powder was then divided into two parts—one part for pelletization followed by activation, and one part for activation followed by pelletization The $Mg(OH)_2$ particles of the latter sample was then thermally converted to MgO. This was accomplished by beating the $Mg(OH)_2$ under dynamic vacuum ($10^{-2}$ Torr) conditions at an ascending temperature rate to a maximum temperature of 500° C. which was held for 6 hours. Further details about the MgO preparation can be found in PCT Publication WO 95/27679, also incorporated by reference herein.

2. Preparation of AP—$Mg(OH)_2$ Pellets and AP—MgO Pellets

Magnesium hydroxide powder and magnesium oxide powder (as prepared above) were each separately ground, using a mortar and a pestle, to remove any clumped powder. A portion of each powder was separately pelletized using the Stokes automatic press resulting in AP—$Mg(OH)_2$ pellets and AP—MgO pellets. The actual pressure applied is unknown because the Stokes press did not have a gauge. However, the actual pressure applied to prepare the pellets is reproducible by controlling the movement of the upper punch on the pelletizer which has a sale. Low compression is just enough pressure to allow the sample to be handled without crumbling. High compression is the maximum compression that an be used without jamming the machine or causing pellets to crack as they are ejected. Medium is the setting approximately half way between low and high.

3. Activation of AP—Mg(OH), Pellets to AP—MgO Pellets

The AP—$Mg(OH)_2$ pellets were thermally converted to AP—MgO pellets in the same manner in which the AP—Mg$(OH)_2$ powder was activated as described above.

4. Determination of Surface area/unit mass and Total Pore Volume of AP—MgO

The surface area/unit mass and total pore volume were measured for the pellets which were activated after pelletization as well as for the pellets which were activated before pelletization. These measurements were made in the same manner as described in Example 1.

Results And Discussion

A. Comparison of characteristics or AP—MgO Pellets Activated Before Pelletization vs. AP—MgO Pellets Activated After Pelletization The results of this test are set forth in Tables 3 and 4 below. In comparing the results, it is observed that the pellets made out of the magnesium hydroxide and subsequently activated possessed higher surface area/unit mass and larger porosity than the pellets which were activated as a powder and then pelletized.

TABLE 3

Surface area/unit mass and pore size distribution of magnesium oxide prepared by activation of hydroxide pellets

| Form | Relative Compression | Multi-point S.A. ($m^2/g$) | % Multi-point S.A.[a] | Single point S.A. ($m^2/g$) | Total pore volume (cc/g) | % Total Pore Volume[b] | Average pore radius (Å) | Pore Shape Type[c] |
|---|---|---|---|---|---|---|---|---|
| Powder | None | 221 | — | 334 | 0.682 | — | 61.9 | E |
| Pellet | Low | 222 | 100.0 | 340 | 0.715 | 104.8 | 64.5 | A, E |
| Pellet | Medium | 214 | 96.8 | 328 | 0.684 | 100.3 | 63.9 | A, E |
| Pellet | High | 214 | 96.8 | 330 | 0.677 | 99.3 | 63.4 | A, E |

[a]Percent of multi-point surface area/unit mass retained by pellet when compared to multi-point surface area/unit mass of the powder.
[b]Percent of total pore volume retained by pellet when compared to a total pore volume of the powder.
[c]Pore shape type abbreviation are as follows: A—Cylindrical pores, open at both ends; D—Tapered or wedged-shaped pores with narrow necks opened at one or both ends; and E—Bottleneck pores

TABLE 4

Surface area/unit mass and pore size distribution of magnesium oxide activated as a powder and then pressed into pellets

| Form | Relative Compression | Multi-point S.A. ($m^2/g$) | % Multi-point S.A.[a] | Single point S.A. ($m^2/g$) | Total pore volume (cc/g) | % Total Pore Volume[b] | Average pore radius (Å) | Pore Shape Type[c] |
|---|---|---|---|---|---|---|---|---|
| Powder | None | 221 | — | 334 | 0.682 | — | 61.9 | E |
| Pellet | Low | 210 | 95.0 | 324 | 0.676 | 99.1 | 64.3 | A, E |
| Pellet | Medium | 205 | 92.8 | 321 | 0.657 | 96.3 | 64.1 | A, E |
| Pellet | High | 199 | 90.0 | 316 | 0.613 | 89.9 | 61.6 | A, E |

[a]Percent of multi-point surface area/unit mass retained by pellet when compared to multi-point surface area/unit mass of the powder.
[b]Percent of total pore volume retained by pellet when compared to a total pore volume of the powder.
[c]Pore shape type abbreviation are as follows: A—Cylindrical pores, open at both ends; D—Tapered or wedged-shaped pores with narrow necks opened at one or both ends; and E—Bottleneck pores

EXAMPLE 3

In this test, surface and pore characteristics of conventionally prepared MgO and CaO and aerogel prepared MgO and CaO were compared. Some samples were pressed before activation (i.e., metal hydroxide was pressed into pellets and the pellets were activated) and some were pressed after activation (i.e., metal hydroxide powder was activated and the obtained oxide was pressed into pallet form). The samples were pressed with a Stokes press as described above. The aerogel powders were prepared as previously described The conventional powders were prepared by hydrating 99.99% ultrapure metal oxide with excess distilled deionized water, heating it under a nitrogen flow forming metal hydroxide, removing the excess of water in the microwave, and treating the metal hydroxide tinder dynamic vacuum at the same conditions used in preparing the aerogel metal oxide as in the previous examples. The surface characteristics were determined by the procedures described in Example 1. The results are illustrated in Table 5 below.

TABLE 5

Results of pelletization studies (Activation = 500° C. vacuum dehydration)

| Sample Description | Multi-Point Surface Area ($m^2/g$) | Single Point Surface Area ($m^2/g$) | Total Pore Volume (cc/g) |
|---|---|---|---|
| CP-MgO Pressed Before Activation | | | |
| Powder | 235 | 241 | 0.438 |
| Medium Compression | 309 | 298 | 0.295 |
| High Compression | 275 | 271 | 0.275 |
| CP-MgO Pressed After Activation | | | |
| Powder | 235 | 241 | 0.438 |
| Medium Compression | 255 | 251 | 0.287 |
| High Compression | 241 | 235 | 0.311 |
| AP-MgO Pressed Before Activation | | | |
| Powder | 343 | 120 | 0.681 |
| Low Compression | 351 | 133 | 0.676 |
| Medium Compression | 337 | 135 | 0.657 |
| High Compression | 341 | 128 | 0.613 |

TABLE 5-continued

Results of pelletization studies (Activation = 500° C. vacuum dehydration)

| Sample Description | Multi-Point Surface Area ($m^2/g$) | Single Point Surface Area ($m^2/g$) | Total Pore Volume (cc/g) |
|---|---|---|---|
| AP-MgO Pressed After Activation | | | |
| Powder | 343 | 120 | 0.681 |
| Low Compression | 335 | 137 | 0.676 |
| Medium Compression | 331 | 134 | 0.657 |
| High Compression | 326 | 141 | 0.613 |
| CP-CaO Pressed Before Activation | | | |
| Powder | 133 | 128 | 0.233 |
| Medium Compression | 93 | 91 | 0.154 |
| High Compression | 80 | 77 | 0.144 |
| CP-CaO Pressed After Activation | | | |
| Powder | 133 | 128 | 0.233 |
| Medium Compression | 105 | 102 | 0.173 |
| High Compression | 132 | 130 | 0.212 |
| AP-CaO Pressed Before Activation | | | |
| Powder | 129 | | 0.198 |
| Low Compression | 137 | | 0.220 |
| Medium Compression | 144 | | 0.231 |
| High Compression | 135 | | 0.222 |
| AP-CaO Pressed After Activation | | | |
| Powder | 129 | | 0.198 |
| Low Compression | 141 | | 0.234 |
| Medium Compression | 141 | | 0.228 |
| High Compression | 146 | | 0.244 |

The data from Table 5 provides further evidence that a higher surface area/unit mass is obtained when the hydroxide is activated in pellet form. This is beneficial, as storage of pelletized, rather than powder, hydroxide is more convenient due to its lower volume. The total pore volume shows the same trend for MgO; however, for CaO it is opposite. The difference is small, so most likely the shorter exposure time will be the main factor in choosing a preparation method. Overall the pelletizing is very beneficial as it preserves surface area/unit mass, decreases the volume, and minimizes the static nature of the powder, making it easier to handle the adsorbent.

EXAMPLE 4

1. Adsorption of Acetaldehyde by MgO pellets

In this test, the adsorptive abilities of MgO pellets were compared to that of MgO powder. AP—$MS(OH)_2$ powder was prepared and thermally activated to AP—MgO powder as described above. MgO pellets (pressed at 4000 psi and activated after pelletization) were also prepared as described above. The adsorption conditions and procedure followed were the same for the pellet as for the powder. Each sample was placed in the U-tube of a conventional Recirculating Reactor. The reactor contained a circulation pump which continually passed the gaseous acetaldehyde over and through the adsorbents. Samples were taken at set time intervals and the pollutant content was analyzed. The contacting step was carried out for about 24 hours. For some experiments, air was added to the acetaldehyde vapor.

2. Results and Conclusions

FIG. 1 graphically illustrates the adsorption of acetaldehyde on powder and pelletized samples of Ap—MgO. Over a period of twenty hours, the efficiency of adsorption on the two samples was very similar. The adsorption on the pelletized samples evolved considerable amounts of heat just as in the adsorption on the powder samples. Furthermore, the adsorption on both the pellets and the powder caused the sample color to change to dark orange. This further indicates that the pelletized AP—MgO has retained the surface characteristic and thus the adsorptive abilities of powder AP—MgO.

EXAMPLE 5

This test, in combination with the results from Example 4, illustrates the superior adsorptive abilities of AP—MgO pellets in comparison to activated carbon, a prior an adsorbent. As demonstrated in Example 4, pelletized AP—MgO has adsorptive abilities very similar to powder AP—MgO. This Example illustrates that powder AP—MgO is substantially superior to activated carbon in its adsorptive abilities. Therefore, pelletized AP—MgO is also substantially superior to activated carbon in its adsorptive abilities. The adsorption conditions and procedures followed were identical to those described in Example 4.

Figure 2:
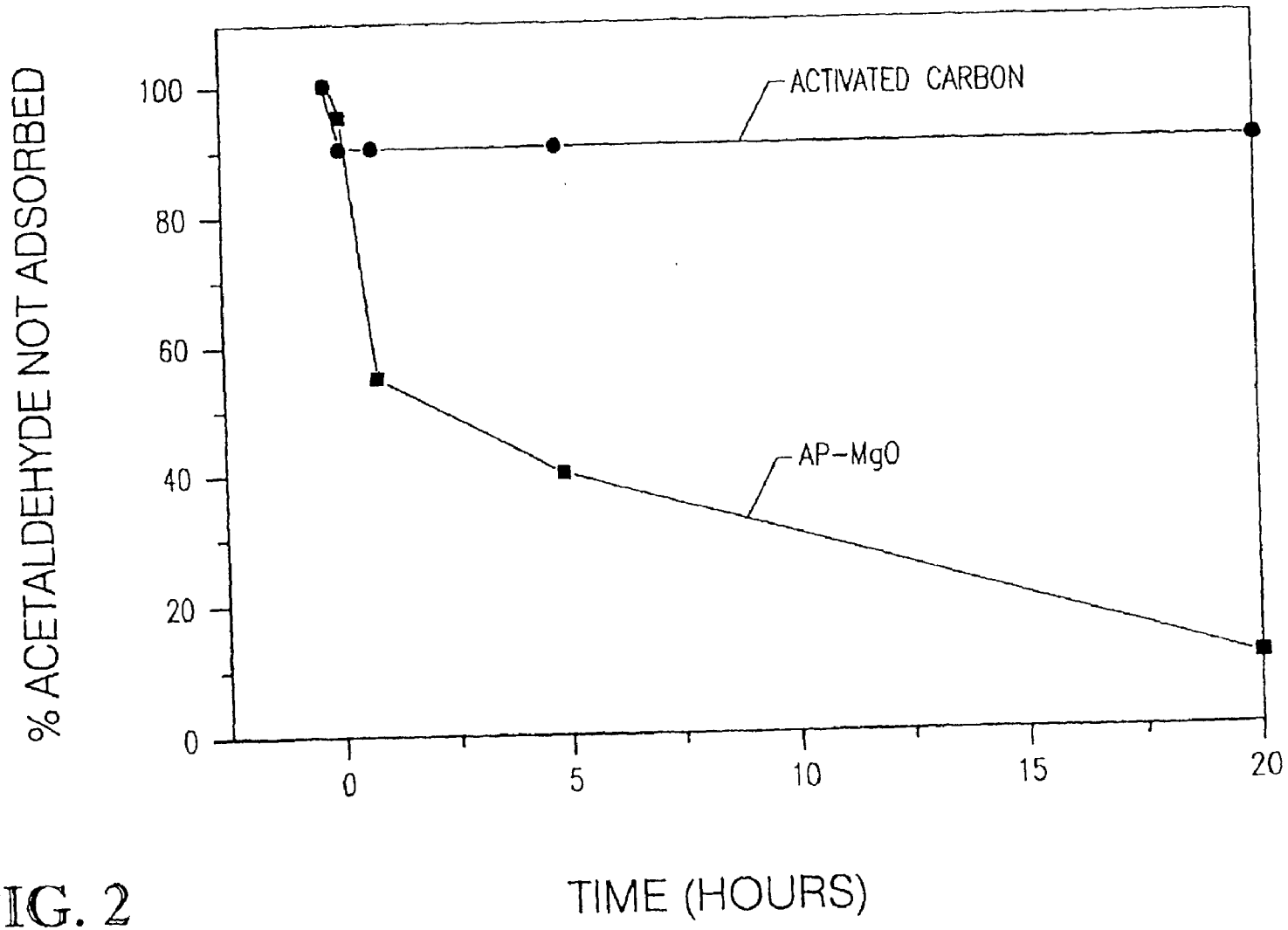
FIG. 2 is a graph illustrating the adsorption of acetaldehyde onto powder AP—MgO in comparison to the adsorption of acetaldehyde onto activated carbon.

The results are shown graphically in FIG. 2. The powder AP—MgO adsorbed substantially more acetaldehyde than the activated carbon, particularly at the twenty hour point. As already demonstrated, the pelletized AP—MgO has surface characteristics and adsorptive abilities comparable to the powder AP—MgO. Therefore, the pelletized AP—MgO has the adsorptive qualities of the powder AP—MgO as well as the reduced volume and greater ease of handling not found in the powder AP—MgO. It follows that the results of the following examples will be applicable to the AP—MgO pellets as well as to the AP—MgO powder.

EXAMPLE 6

The ability of powder AP—MgO, CP—MgO, and CM—MgO to adsorb acetaldehyde was analyzed in the absence of air. Each sample was placed in the U-tube of a conventional Recirculating Reactor. The reactor contained a circulation pump which continually passed the gaseous acetaldehyde over and through the adsorbents. Samples were taken at act time intervals and the pollutant content was analyzed. The contacting step was carried out for about 20 hours.

Figure 3:
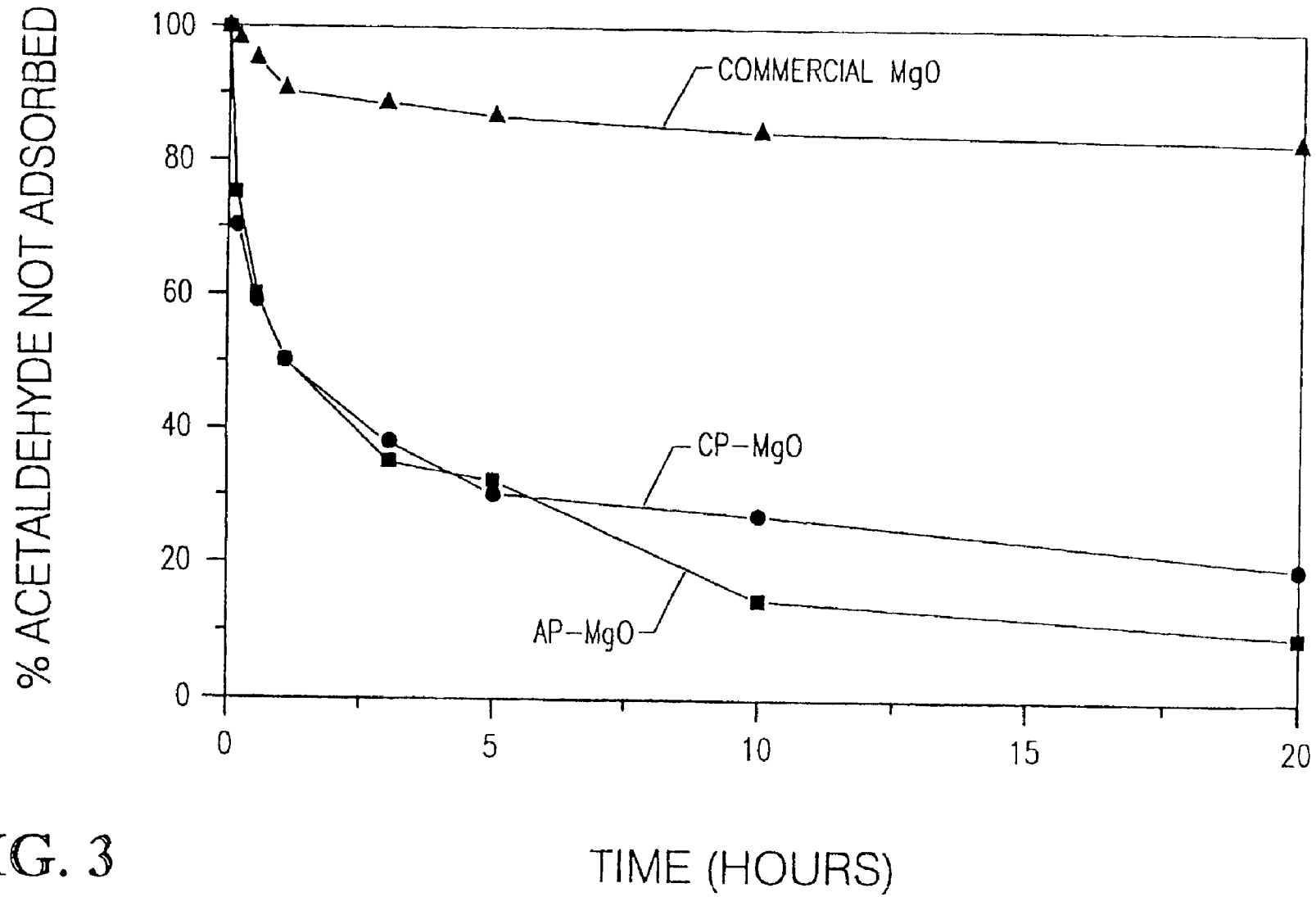
FIG. 3 is a graph illustrating the adsorption of acetaldehyde onto powder AP—MgO, powder CP—MgO, and powder CM—MgO.

The results of this experiment are depicted in FIG. 3. One mole of AP—MgO adsorbed one mole of acetaldehyde at room temperature over a start period of time. The adsorption was exothermic with a considerable amount of heat being evolved. The color of the solid sample changed dramatically from a whitish-gray before adsorption to a dark orange after adsorption. While adsorption was rapid and vigorous onto the AP—MgO and CP—MgO samples, it was barely observable on the CM—MgO sample where no beat or color changes were observed.

EXAMPLE 7

This series of tests was conducted to determine the effort of air exposure on the adsorptive abilities of powder AP—MSO in comparison to activated carbon. The following categories of samples were analyzed: fresh samples of AP—MgO and commercial activated carbon; AP—MgO and commercial activated carbon samples exposed to air for 24 hours; AP—MgO and commercial activated carbon samples exported to air for ten (10) days; and AP—MgO and commercial activated carbon stored in an oven under air (60° C.) for ten (10) days. The adsorptive procedure followed was identical to that set forth in Example 6.

Figure 4:
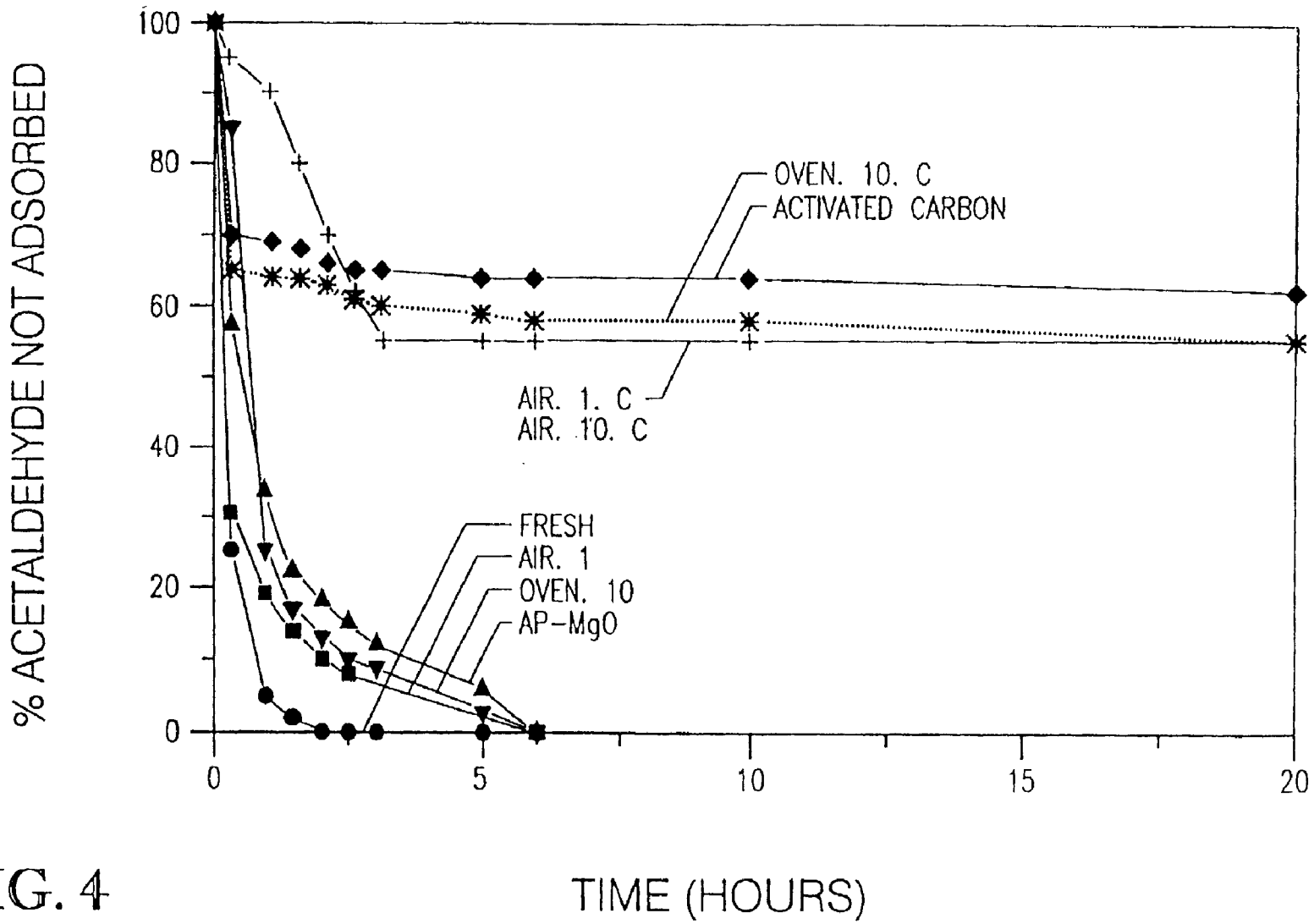
FIG. 4 is a graph depicting the adsorption of acetaldehyde onto powder AP—MgO after exposure to air for varying lengths of time versus the adsorption of acetaldehyde onto activated carbon exposed to air for varying lengths of time.

The results (FIG. 4) demonstrate that the different environments have only a slight effect on the adsorption process. Furthermore, in each instance, the AP—MgO adsorbed substantially more acetaldehyde than did the activated carbon.

EXAMPLE 8

Figure 5:
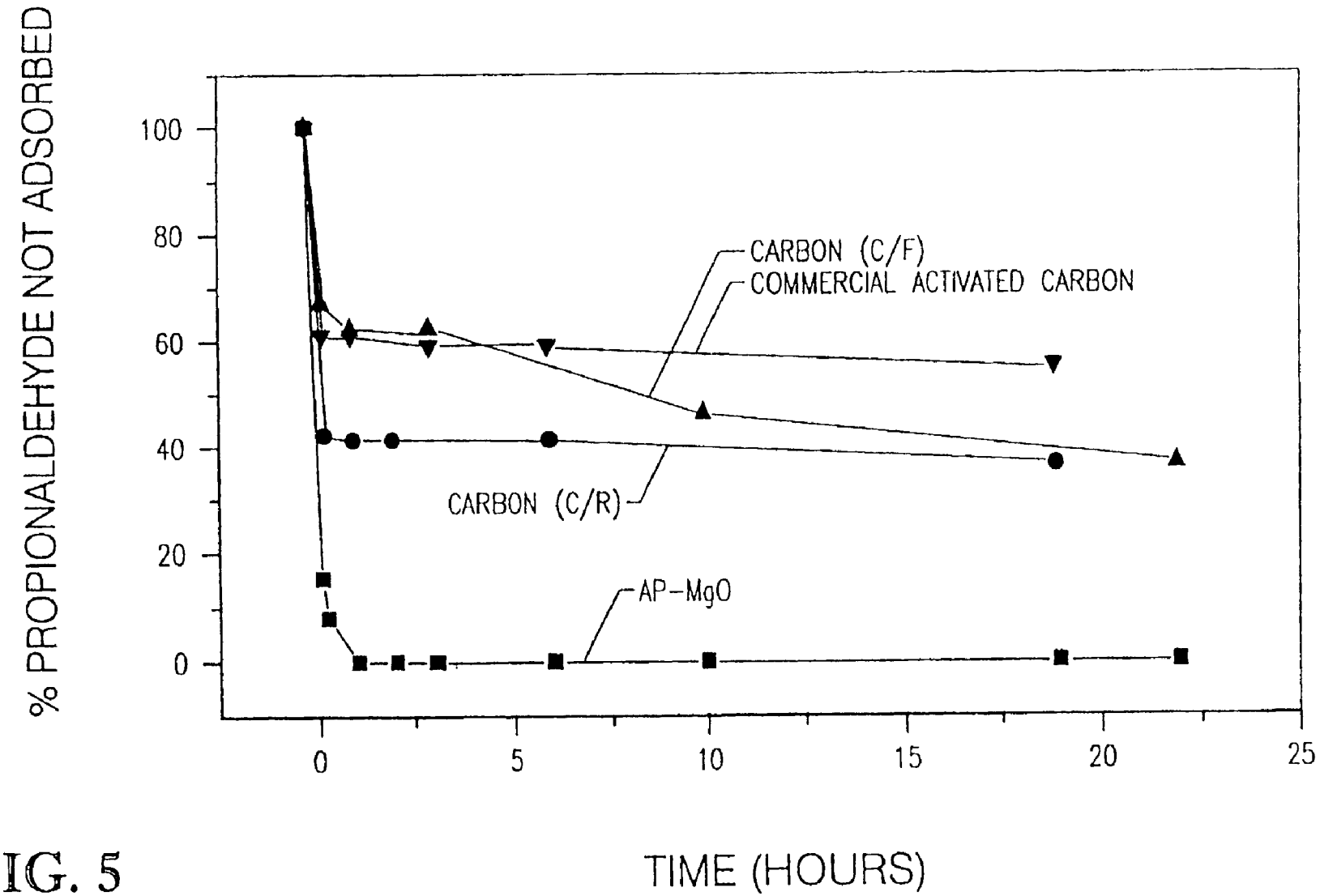
FIG. 5 is a graph comparing the adsorption of propionaldehyde onto powder AP—MgO under atmospheric pressure of air with the adsorption of propionaldehyde onto commercial samples of activated carbon under atmospheric pressure of air.

An experiment was conducted to determine the ability of powder AP—MgO to adsorb organic species other than acetaldehyde. This ability was cot pared to the adsorptive ability of three commercially available samples of activated carbon. The molar ratio of adsorbent to propionaldehyde was 10:1. The adsorption conditions and procedures followed were as described in Example 4 except that gaseous propionaldehyde was recirculated over and through the adsorbents under atmospheric pressure of air for about 20 hours. As set forth in FIG. 5, the AP—MgO adsorbed more propionaldehyde than any of the activated carbon samples. As shown is Example 4, pelletized AP—MgO will achieve substantially the same results.

EXAMPLE 9

Figure 6:
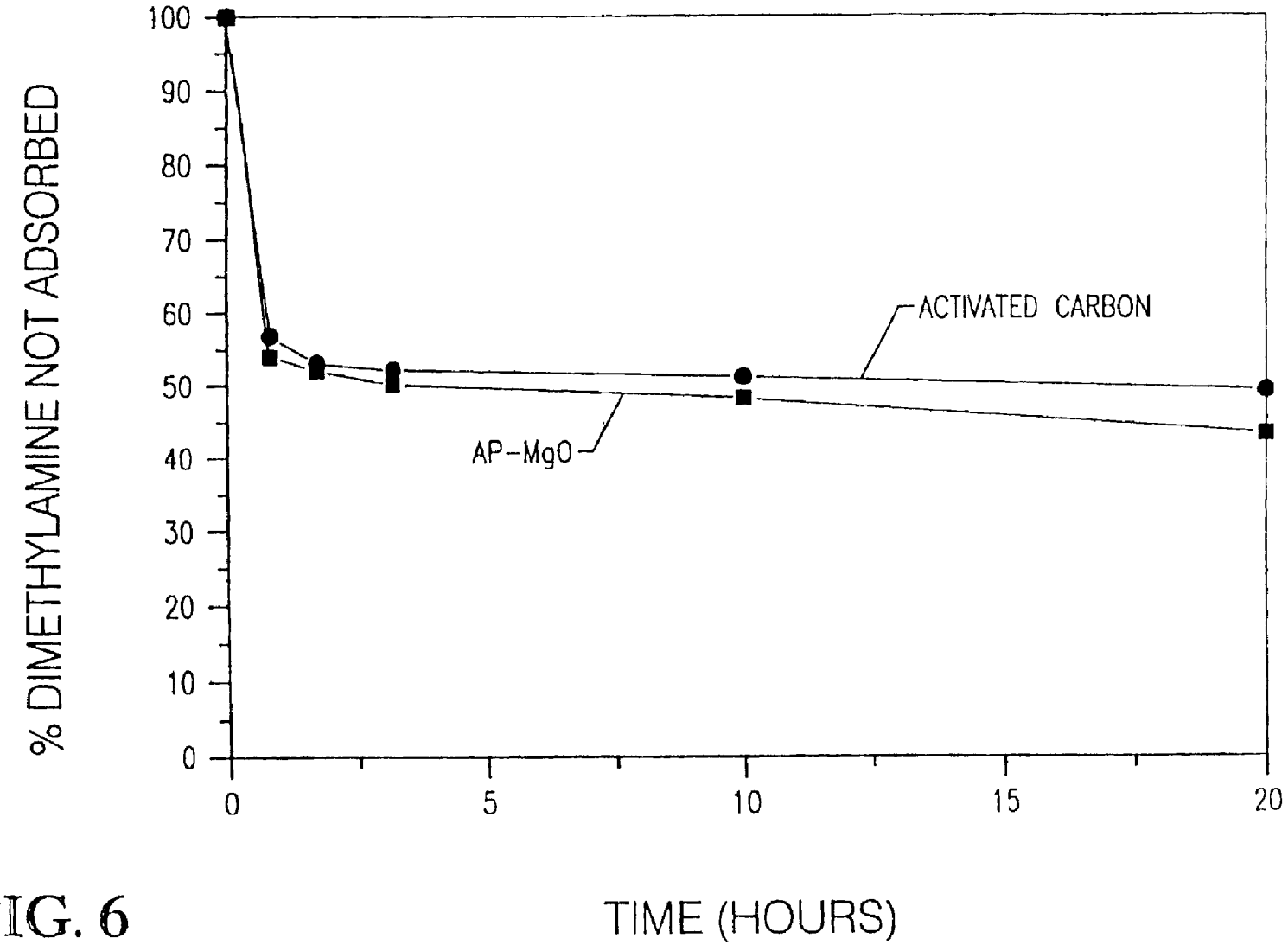
FIG. 6 is a graph comparing the adsorption of dimethylamine onto powder AP—MgO under atmospheric pressure of air with the adsorption of dimethylamine onto activated carbon under atmospheric pressure of air.

An experiment was conducted to determine the ability of powder AP—MgO to adsorb dimethylamine compared with the ability of activated carbon to adsorb dimethylamine. The molar ratio of adsorbent to dimethylamine was 10:1. The adsorption conditions and procedures followed were as described in Example 8 except that gaseous dimethylamine was recirculated over and through the adsorbents under atmospheric pressure of air for about 20 hours. As set forth in FIG. 6, the AP—MgO adsorbed more dimethylamine than the activated carbon samples. Pelletized AP—MgO will achieve substantially the same results as the powder AP—MgO.

EXAMPLE 10

Figure 7:
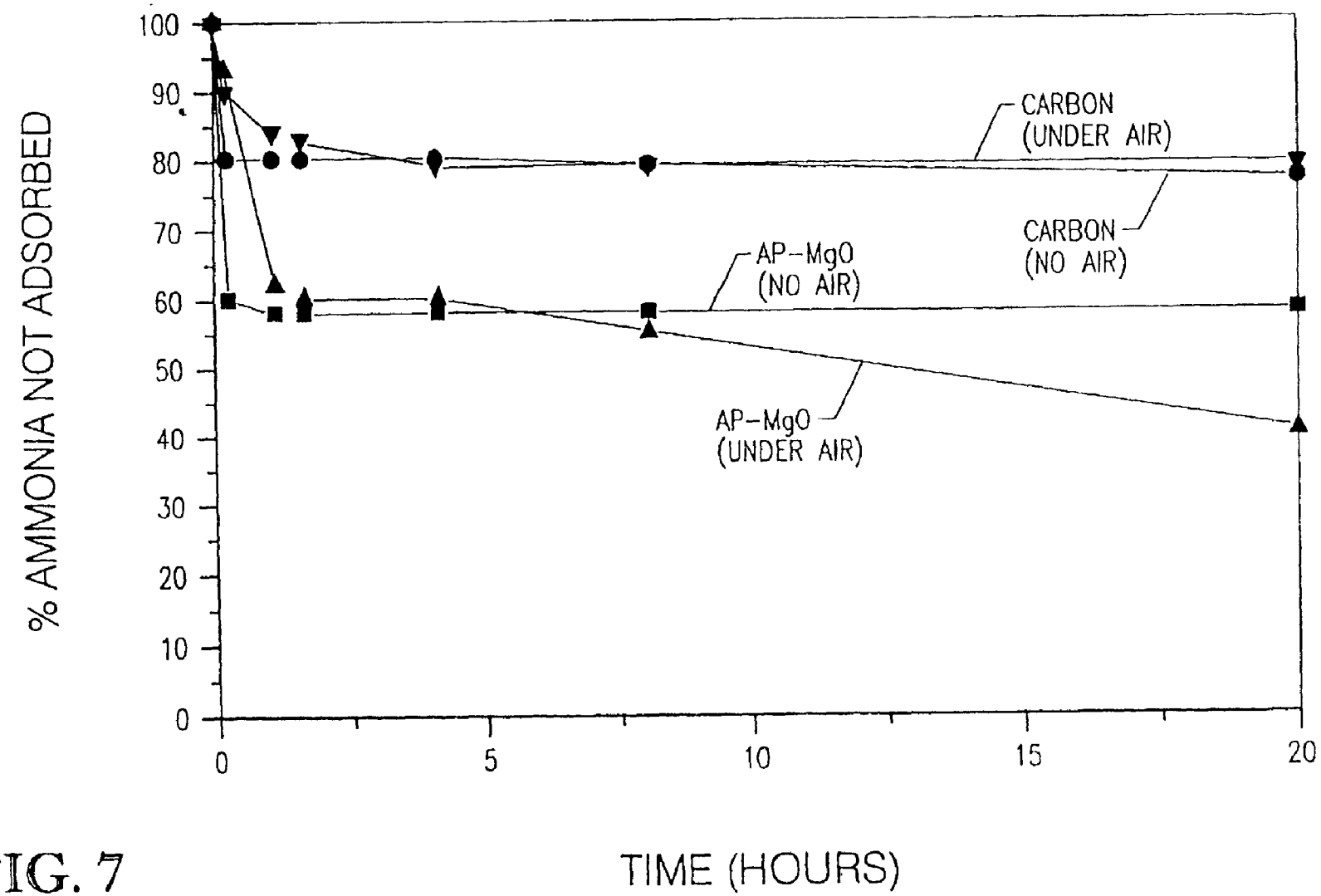
FIG. 7 is a graph illustrating the adsorption of ammonia onto powder AP—MgO both with and without exposure to air and comparing this adsorption to adsorption of ammonia onto activated carbon both with and without exposure to air.

An experiment was conducted to determine the ability of powder AP—MgO to adsorb ammonia compared with the ability of activated carbon to adsorb ammonia. The molar ratio of adsorbent to ammonia was 10:1. The adsorption conditions and procedures followed were as described in Example 8 except that gaseous ammonia was recirculated over and through the adsorbents for about 20 hours both under air and in the absence of air. Asset forth in FIG. 7, the AP—MgO adsorbed more ammonia than the activated carbon samples. While the ammonia was adsorbed is lesser amounts than the aldehydes, it was adsorbed at a rapid rate. Pelletized AP—MgO will achieve substantially the same results as the powder AP—MgO.

EXAMPLE 11

Figure 8:
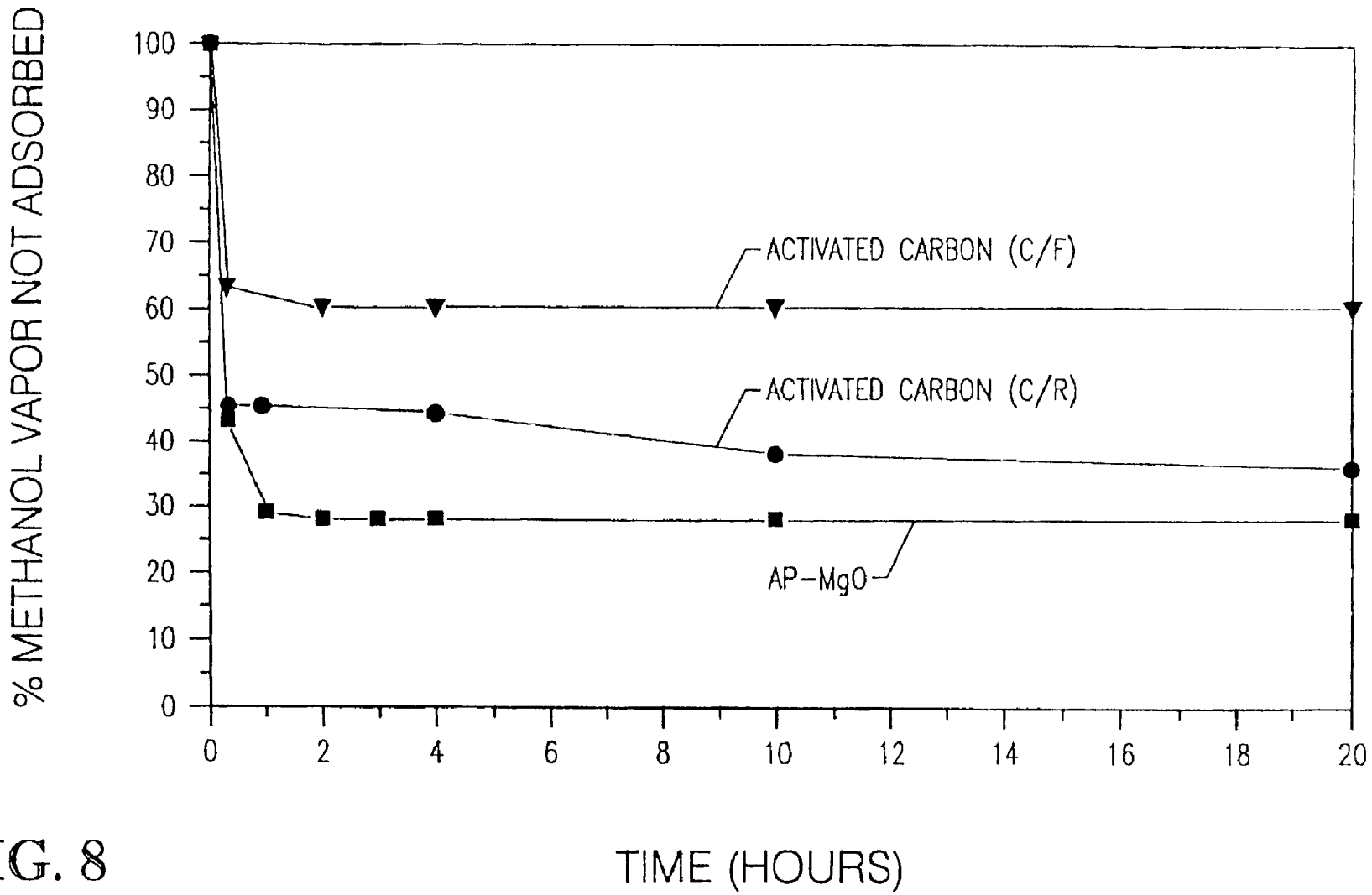
FIG. 8 is a graph which depicts the adsorption of methanol onto powder AP—MgO under one atmosphere pressure of air compared to the adsorption of methanol onto activated at one atmosphere pressure of air.

An experiment was conducted to determine the ability of powder AP—MgO to adsorb methanol as compared to the ability of activated carbon to adsorb methanol. The molar ratio of adsorbent to methanol was 10:1. The adsorption conditions and procedures followed were as described in Example 8 except that gaseous methanol was recirculated over and through the adsorbents for about 20 hours under air. As set forth in FIG. 8, the AP—MgO adsorbed substantially more methanol than the activated carbon samples adsorbed. While the methanol was adsorbed in teaser amounts than the aldehydes, it was adsorbed at a rapid ate. Pelletized AP—MgO will achieve substantially the same results as the powder AP—MSO.

EXAMPLE 12

Production of Pallet Using a Disk Granulator

The metal hydroxide powder is granulated in a Colton Model 561 Rotary Wet Granulator to generate spherical particles of about 10 mm in diameter. These particles are granulated through an addition of small amounts of water. The minimum amount of water is used to start the growth of granules.

Granules of the hydroxide after some drying in air or inert atmosphere are activated to oxides, which regenerates the high surface area. This is accomplished by heating the $Mg(OH)_2$ under dynamic vacuum ($10^{-2}$ Torr) conditions at an ascending temperature rate to a maximum temperature of 500° C. which is held for 6 hrs.

EXAMPLE 13

Production of Metal Oxide Powder-Enhanced HEPA Filter Using Spray Granulation

A mark 20 HEPA from Natural Solutions is impregnated using high surface area metal oxides. Metal oxides an be applied to the filter substrate by spraying metal oxide or hydroxide mixed with water, or other solvent. In this technique, water or solvent droplets adhere to the filter substrate, forming a porous layer of powder bound to the filter. In case water is used and there is significant conversion from oxide so hydroxide, the Sitar has to be activated. Processing under vacuum to reactivate the oxide may be used.

We claim:

1. A composite comprising a self-sustaining body formed of a plurality of agglomerated nanocrystalline particles having as avenge crystallite size of up to about 20 nm and selected from the group consisting of metal oxides and hydroxides and mixtures thereof, said body having a total pore volume which is at least about 90% of the total pore volume of said particles prior to said agglomeration thereof, said body having a density of from about 0.2 to about 2.0 $g/cm^2$.

2. The composite of claim 1, said particles being selected from the group consisting of MgO, CaO, $TiO_2$, $ZrO_2$, FeO, $V_2O_3$, $V_2O_5$, $Mn_2O_3$, $Fe_2O_3$, NiO, CuO, $Al_2O_3$, ZnO, $Mg(OH)_2$, $Ca(OH)_2$, FeO(OH), $Ni(OH)_2$, $Cu(OH)_2$, $Al(OH)_3$, $Zn(OH)_2$, and mixtures thereof.

3. The composite of claim 2, said particles being MgO.

4. The composite of claim 2, said particles being CaO.

5. The composite of claim 1, said body formal by pressing together said particles at a pressure of from about 50 psi to about 6,000 psi.

6. The composite of claim 5, said particles being proud at a pressure of from about 100 psi to about 5,000 psi.

7. The composite of claim 6, said particles being pressed at a pressure of 2,000 psi.

8. The composite of claim 1, said particles being pressed-together.

9. A method of adsorbing a target compound comprising the steps of:

providing a quantity of the composite of claim 1; and contacting said composite with a target compound selected from the group consisting of acids, alcohols, aldehydes, compounds containing an atom of P, S, N, Se, or Te, hydrocarbon compounds, and toxic metal compounds under conditions for adsorbing at least a portion of said target compound.

10. The method of claim 9, said particles being selected from the group consisting of MgO, CaO, $TiO_2$, $ZrO_2$, FeO, $V_2O_3$, $V_2O_3$, $Mn_2O_3$, $FeO_3$, NiO, CuO, $Al_2O_3$, ZnO, $Mg(OH)_2$, $Ca(OH)_2$, $Fe_2(OH)$, $Ni(OH)_2$, $Cu(OH)_2$, $Al(OH)_3$, $Zn(OH)_2$, and mixtures thereof.

11. The method of claim 10, said particles being MgO.

12. The method of claim 10, said particles being CaO.

13. The method of claim 9, said target compound being in the form of a gas.

*14. A method of removing an acid from a gas stream comprising the steps of:*

*providing a quantity of self-sustaining bodies formed of agglomerated, nanocrystalline metal oxide particles selected from the group consisting of CaO, $Ca(OH)_2$, ZnO, $Zn(OH)_2$, and admixtures thereof, the particles*

*have an average crystallite size of up to about 20 nm, said bodies having a total pore volume which is at least about 50% of the total pore volume of said particles prior to agglomeration thereof; and*

*passing a stream of acid-bearing gas into contact with said self-sustaining bodies under conditions for removing at least a portion of said acid from the gas stream.*

*15. The method of claim 14, wherein said acid contains, a sulfur atom.*

*16. The method of claim 14, said particles in the form of compressed-together bodies produced by pressing together said particles at a pressure of from about 50 psi to about 6,000 psi.*

*17. The method of claim 14, said bodies formed by pressing together said particles at a pressure of from about 500 psi to about 5,000 psi.*

*18. The method of claim 14, said bodies having a density of from about 0.2 to about 2.0 g/cm$^3$.*

*19. The method of claim 14, said particles being CaO.*

* * * * *

UNITED STATES PATENT AND TRADEMARK OFFICE

CERTIFICATE OF CORRECTION

PATENT NO. : RE 39,098 E
APPLICATION NO. : 09/933474
DATED : May 23, 2006
INVENTOR(S) : Kenneth J. Klabunde et al.

It is certified that error appears in the above-identified patent and that said Letters Patent is hereby corrected as shown below:

Col. 14, Ln. 35 in claim 5, replace the word “formal” with the word --formed.--

Col. 14, Ln. 38 in claim 6, replace the word “proud” with the word --pressed.--

Signed and Sealed this

Third Day of July, 2007

JON W. DUDAS
*Director of the United States Patent and Trademark Office*